United States Patent
Kobald et al.

[15] 3,659,618
[45] May 2, 1972

[54] CONTROL SYSTEM FOR LIMITING THE LOADING OF BRANCHED DRIVES

[72] Inventors: Walter Kobald, Stuttgart-Feuerbach; Paul Bosch, Ludwigsburg, both of Germany

[73] Assignee: Robert Bosch GmbH, Stuttgart, Germany

[22] Filed: Oct. 29, 1969

[21] Appl. No.: 872,280

[30] Foreign Application Priority Data

Nov. 2, 1968    Germany............P 18 06 677.8

[52] U.S. Cl. ........................................130/27 R, 56/DIG. 15
[51] Int. Cl. ..............................................A01f 12/28
[58] Field of Search..................56/20, 21, 10.3, DIG. 15; 130/27.19, 24, 26, 27 R

[56] References Cited

UNITED STATES PATENTS 3,093,946   6/1963   Pitt et al. ........................................56/20
3,470,681   10/1969  Saemann ........................................56/20

FOREIGN PATENTS OR APPLICATIONS 234,307   6/1961   Australia........................56/DIG. 15

Primary Examiner—Antonio F. Guida
Attorney—Michael S. Striker

[57] ABSTRACT

A control system for the main drive and auxiliary drives of a combine in which the main drive propels the vehicle, and the auxiliary drive operates a threshing drum and its conveyor. An engine drives the threshing drum directly, and the conveyor through a coupling, and also drives the pump of a hydrostatic transmission whose hydraulic motor propels the vehicle. A transducer pump, driven from the engine, and a throttle provide hydraulic signals controlling a valve to effect regulation of the transmission pump of the main drive, and to disengage the coupling to reduce the load on the engine. Setting means are provided for limiting the drive torque of the engine to a selected desired value, causing speed reduction and actuation of the control valve.

15 Claims, 1 Drawing Figure

Patented May 2, 1972
3,659,618
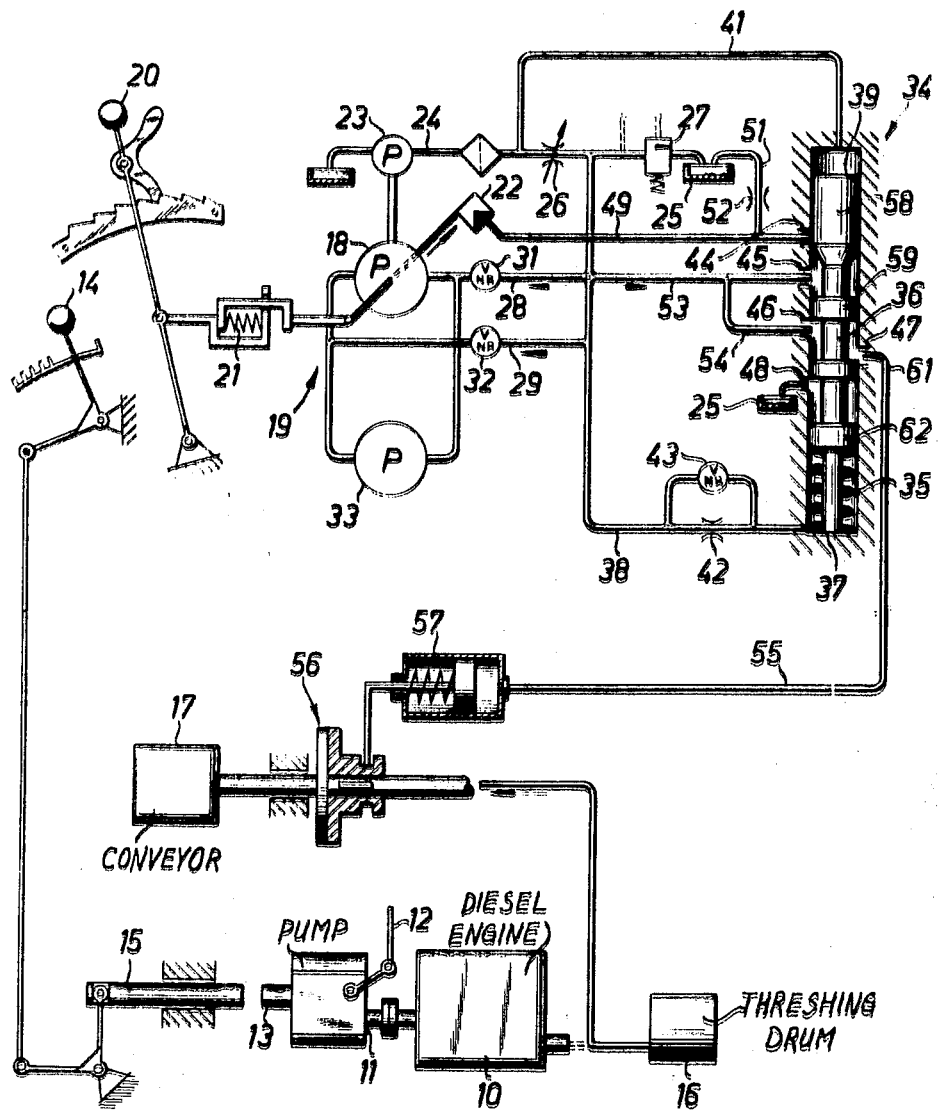
INVENTORS
Walter KOBALD
Paul BOSCH
By
their ATTORNEY 3,659,618

CONTROL SYSTEM FOR LIMITING THE LOADING OF BRANCHED DRIVES

BACKGROUND OF THE INVENTION

The present invention resides in a control system for a machine drive with drive branches consisting of a main drive and at least one branch or auxiliary drive influenced in operation through the main drive. An arrangement is provided for limiting the load of the auxiliary drive, and an adjustable operating mechanism in the main drive is provided between the machine drive and the driven part.

A control system for threshers is known in the art, in which the forward motion of the thresher is controlled by the crop condition, and which has a load limitation for the threshing mechanism. In this known arrangement, the driving torque of the threshing drum is measured, and is compared with a preset desired input torque. When the actual output torque is in excess, the feed of threshing material is reduced or entirely discontinued. For this control system, known in the art, the equipment is considerably complex and expensive.

Accordingly, it is an object of the present invention to avoid this disadvantage by providing a control system for branched drives with load limitations, and to provide such a system through simple design and construction and so that all requirements of the operating drives are met.

The objects of the present invention are achieved by providing a setting arrangement in the operating drive machine for limiting the driving torque. An adjustable drive of conventional design is used in the form of a hydrostatic mechanism with an adjusting pump. A signal generator or transducer is influenced by the pump and provides signals which are inversely related to the loading of the auxiliary drive. The signals are used to control a control valve which is operatively connected with the adjusting pump in the main drive and a coupling in the auxiliary drive, and apply a limiting influence in the loading of the auxiliary drive.

In accordance with the present invention, setting means limit the torque of the driving machine. This may be taken into consideration with the condition that in many cases the required driving torque of a main drive is relatively small and doesnot vary too rapidly. As a result, the torque available for the auxiliary drive is also limited, and any overloading of the auxiliary drives becomes thereby prevented in a simple manner. The control system of the present invention is, consequently, significantly less complex and thereby less expensive. The present invention, furthermore, makes possible in addition to these advantages, extremely reliable operations.

A particular advantageous embodiment of the present invention uses a transducer for the rotational speed in the form of a hydraulic pump. The pump generates fluid under pressure which is passed through a measuring throttle and the resulting pressure difference across the throttle is used for controlling a valve.

The preceding control system is particularly advantageously adapted for mowing threshers or reapers in which the overloading of the threshing drum is to be prevented.

SUMMARY OF THE INVENTION

A control system for operating a threshing drum and conveyor for feeding material to be threshed. A diesel engine is directly coupled to the threshing drum for operating the latter, and also drives a conveyor through a coupling. The coupling cooperates with a hydraulic cylinder for limiting the load which may be applied to the auxiliary drive branched from the engine and leading to the conveyor. An adjusting pump is connected between the engine and the main drive leading to the threshing drum. A transducer in the form of a hydraulic pump is mechanically coupled to the adjusting pump and provides an output flow which is inversely related to the load. The directional valve is controlled by the transducer pump so as to limit the loading of the conveyor through the coupling thereto.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

A functional schematic diagram of a control system for operating a threshing drum and conveyor from a diesel engine, in accordance with an embodiment of the present invention.

DESCRIPTION OF THE PREFERRED EMBODIMENTS

Referring to the drawing, the control system has a diesel engine 10 as a source of driving power and having a fuel injection pump 11. The lever 12 of this pump serves as a regulating means for setting the engine speed. The injection pump 11 has also a regulating rod 13 which is abutted by an adjustable setting member 15 linked to a load lever 14. The diesel engine 10 drives a threshing drum 16, a conveyor 17 for the threshing material, and a displacement pump 18 of a hydraulic drive 19 having a hydraulic motor 33 for the vehicle operation.

The adjusting pump 18 is settable or adjustable, on one hand, by a lever 20 with locking pawl and ratchet acting through a spring arrangement 21. The pump 18 is also adjustable or settable on the other hand, through a hydraulic positioning cylinder 22. Mechanically coupled with the adjusting pump 18, is a pump 23 which operates as a transducer. A flow line or conduit 24 extends from the pressure side of the pump 23 to a storage tank or reservoir 25. A measuring throttling device 26 and a pressure-retaining valve 27 are connected next to each other and in the flow line 24. The section of the line 24 between the throttling device 26 and the pressure-retaining valve 27, leads to flow lines 28 and 29 containing check valves 31 and 32, respectively. Through these flow lines 28 and 29 and the corresponding check valves 31, 32, this portion of the flow line 24 communicates with the closed circuit consisting of the adjusting pump 18 and a hydraulic motor 33 for the vehicle drive.

The control system includes furthermore a control valve 34 with a control slide 36 which is abutted on one side by a spring 35. The frontal side 37 is subjected to the force of the spring, and connects a line 38 with the section of the flow line 24 mentioned above. The other side 39 communicates, on the other hand, through a line 41 with the line 24 upstream of the throttling device 26. A throttling device 42 is situated within the line 38, and a check valve 43 is connected in parallel with the throttle 42. The control valve 34 has five connections of ports 44 to 48. The connection 44 of the valve 34 communicates with the positioning cylinder 22, through a line 49. At the same time, this connection 44 leads through a line 51, to the reservoir or storage tank 25, via a throttle 52. Connections 45 and 46 connect the lines 53 and 54 with the section of the line 24 lying between the measuring throttle 26 and the pressure-retaining valve 27. The connection 48 of the valve 34 leads to the storage tank or reservoir 25. The connection 47 of the valve 34 communicates, through a line 55, with a coupling actuating cylinder and piston 57 actuating the coupling 56 for the conveyor 17.

The control slide 36 is subdivided by ring-shaped channels into four sections 58,59,61, and 62. The sections 59 and 61, in the positions shown in the drawing, connect the ports 46 and 47, whereas the connection from the port 48 to port 47 is blocked or closed off. The port 44 is closed through the section 58.

In operation of this system, the driver sets the required driving engine speed by the speed lever 12. By the load lever 14, the driver limits, on the basis of his observations, the possible displacement of the regulating rod 13 of the fuel injection pump 11. Through such regulation of this rod 13, the torque of the diesel engine is correspondingly regulated to the extent that the threshing mechanism, which requires the greatest part of the driving machine power, is extensively utilized. Since the drive transmission 18,33 requires a relatively small driving torque relative to the threshing mechanism, the torque for the threshing drum 16 is controlled and thereby an overloading of the threshing mechanism prevented. The driving torque, furthermore, does not vary rapidly.

During operation, a predetermined driving speed is initially set by lever 20 and thereby through corresponding setting of the adjusting pump 18 of the hydrostatic driving system 19. The pump 23 which is also driven by the diesel engine 10, pumps fluid under pressure which maintains the control slide 36 in the illustrated position against the force of the spring 35, due to the pressure drop across the measuring throttle 26. The pressure established by the pressure-retaining valve 27, is transmitted through the lines 53,54, the ports 46,47, and the lines 55 within the coupling actuating cylinder 57. This pressure maintains the coupling 56 closed. As a result, the conveyor 17 operates and conveys threshing material to the threshing drum 16. The piston section 58 of the control slide 36 is provided with a fine control chamfer or bevel, and permits only a comparatively light flow from the port 45, through the port 44 and the line 51 with the throttle 52, and into the reservoir 25. The latter cannot, however, build up any pressure within the positioning cylinder 22.

If the load of the threshing mechanism now increases and the regulating rod 13 abuts against the member 15, then the rotational speed of the diesel engine 10 and of pump 23 is reduced. When this speed drops below a predetermined level, the pressure differential produced by the measuring throttle 26 is no longer adequate for the purpose of retaining the control slide 36 in the position shown in the drawing. As a result, the spring 35 displaces the control slide 36. The control slide section 58 thereby increases the opening of the port 44 through its fine control bevel or chamfer, so that the rising pressure through the line 49 in the positioning cylinder 22 adjusts the pump 18 for delivering at a lower flow rate. Through the decrease in speed of the vehicle, less threshing material drops onto the conveyor 17, and the threshing mechanism becomes less loaded. In many cases this is sufficient in order to permit again a rise in the driving machine speed.

If the rotational speed of the diesel engine drops further, anyhow, then the control slide 36 becomes still further displaced from its position shown in the drawing and controls the connection from the port 46 to the coupling actuating cylinder 57 and relieves the latter through the port and into the reservoir. As a result, the conveyor and the diesel engine 10 become decoupled from each other. The positioning cylinder 22 becomes now rapidly supplied with fluid under pressure, at the same time, through the port 44 which is now wide open. The displacement pump 18 becomes, thereby, rapidly reset. In this manner, rapid and complete unloading of the threshing mechanism is attained.

When the speed of the diesel engine rises again subsequently to the unloading of the threshing mechanism, the pressure drop produced by the throttle 26, resets again the control slide 36 against the force of the spring 35, when this pressure drop has attained a predetermined magnitude. As a result, the conveyor 17 becomes again coupled to be driven, and the operating speed of the thresher is increased to the preset magnitude determined by the setting of the lever 20 and the action of the spring 21 thereon. Both processes are controlled in sequence and in time by the valve 36. Aside from this, the throttles 42 and 52 produce a delay for the purpose of preventing renewed overloading.

In place of the hydrostatic drive used as a main operating mechanism, it is of course also possible to use any other mechanism adapted to torque conversion.

It will be understood that each of the elements described above, or two or more together, may also find a useful application in other types of constructions differing from the types described above.

While the invention has been illustrated and described as embodied in control systems for branched drives, it is not intended to be limited to the details shown, since various modifications and structural changes may be made without departing in any way from the spirit of the present invention.

What is claimed as new and desired to be protected by Letters Patent is set forth in the claims.

We claim:

1. A control system for a driving arrangement, comprising, in combination, a source of driving power; main drive means; transmission means connecting said source of driving power with said main drive means, and including a regulatable adjusting pump means driven from said source of driving power; setting means for limiting the drive torque of said source of power to a desirable selected maximum torque; auxiliary drive means including coupling means having an engaged position for connecting said auxiliary drive means with said source of power, and a disengaged position; transducer means coupled with said adjusting pump means and having output means generating control signals inversely related to the load on said source of driving power; and control valve means operated by said control signals, and operatively connected with said adjusting pump means for adjusting the same, and thereby said main drive means, and also operatively connected with said coupling means for moving the same to said disengaged position so that the load applied by said auxiliary drive means to said source of driving power is limited.

2. The control system as defined in claim 1 including a fluid line, said transducer means being a hydraulic pump mechanically coupled to said adjusting pump means and having the pressure side of said hydraulic pump connected to said fluid line; throttle means in said fluid line; pressure retaining valve means in said fluid line and connected in series with said throttle means; and fluid reservoir means; and fluid reservoir means connected to said pressure retaining value means.

3. The control system as defined in claim 2 including control slide in said valve means; spring means acting on said control slide on one side thereof; second fluid line means communicating with said side of said control slide acted on by said spring means and said first fluid line downstream of said throttle means; and third fluid line means connecting the other side of said control slide with said first fluid line upstream of said throttle means.

4. The control system as defined in claim 3 wherein a first port of said valve means is connected with a second port of said valve means leading to said coupling means when the pressure difference across said throttle means displaces said control slide against the force of said spring means into a predetermined reset position.

5. The control system as defined in claim 4 including a positioning cylinder on said adjusting pump means, said valve means having a third port communicating with said positioning cylinder and being connected to a fourth port of said valve means when said control slide is in said reset position.

6. The control system as defined in claim 5 including return flow means communicating with said valve means and said coupling means when said control slide is in an end position spaced from said reset position, the connection between said first and second port being closed when said control slide is displaced from said reset position, and the connection between said third and fourth port being opened when said control slide is displaced from said reset position.

7. The control system as defined in claim 6 including fourth fluid line means between said third port and said positioning cylinders; and throttle means communicating with said fourth fluid line means and said fluid reservoir means, said fourth fluid line means discharging into said reservoir means through said throttle means.

8. The control system as defined in claim 3 including throttle means in said second fluid line means between said first fluid line means and said one side of said control slide acted upon by said spring means; and check valve means connected in parallel with said throttle means.

9. The control system as defined in claim 3 including first check valve means connected to the inlet of said adjusting pump means; second check valve means connected to the outlet of said adjusting pump means; and means for connecting said first fluid line means to said first and second check vale means, whereby said first fluid line means communicates with the inlet and outlet of said adjusting pump means through said check valve means.

10. The control system as defined in claim 1 including torque output limiting means operatively coupled to said source of driving power.

11. The control system as defined in claim 1 wherein said valve means comprises a spring biased directional valve slide.

12. The control system of claim 1 wherein said transmission means includes a hydraulic motor driving the main drive means of a vehicle; and wherein said auxiliary drive means include threshing drum means and conveyor means for said threshing drum means.

13. The control system of claim 12 wherein said threshing drum means is directly coupled with said source of driving power; and wherein said conveyor means is connected by said coupling means with said source of driving power.

14. The control system of claim 1 wherein said setting means include a manually settable stop; wherein said source of driving power includes an engine, and a fuel injection pump for said engine, said fuel injection pump having a control rod cooperating with said stop.

15. The control system of claim 1 wherein said adjusting pump has a regulator controlled by said valve means; and comprising manual means for setting said regulator.

* * * * *